July 27, 1948.   F. F. KOLZ   2,446,156
AUTOMATIC FREEZER CONTROL AND REFRIGERATING SYSTEM
Filed May 13, 1946
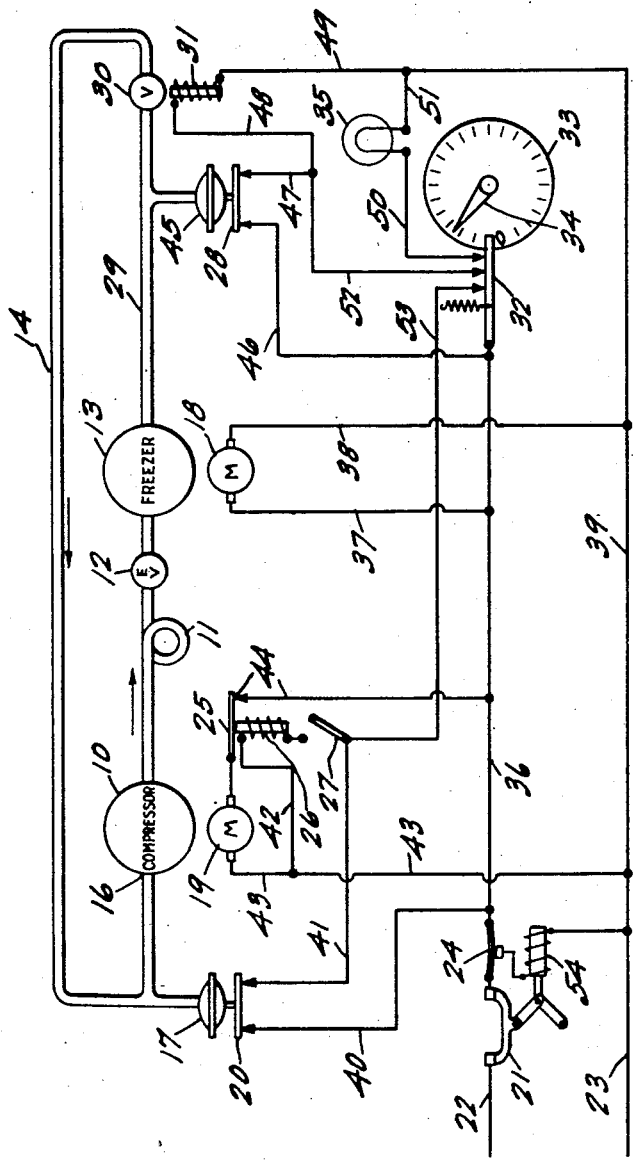
Inventor
Frank F. Kolz.
By Philip A. Tindall
Attorney Patented July 27, 1948

2,446,156

UNITED STATES PATENT OFFICE 2,446,156

AUTOMATIC FREEZER CONTROL AND REFRIGERATING SYSTEM

Frank F. Kolz, Berkeley, Calif.

Application May 13, 1946, Serial No. 669,237

7 Claims. (Cl. 62—114)

1

This invention, an automatic freezer control and refrigerating system is designed principally for controlling ice cream freezers and the like though it is adaptable to other purposes where fast freezing at times is desirable while normally maintaining standard freezing conditions.

Motor-driven, mechanically refrigerated freezers require constant attention to prevent overloading of the freezer-driving motor, and to provide a fast-freeze interval at initiation of freezing, or where the freezing must be rushed. This requires the services of an attendant who is ever on the alert, because after a certain point in freezing is reached, freezing becomes more rapid, and may unexpectedly reach the point where the material being frozen becomes so stiff as to seriously overload the driving motor and cause the motor to burn out or break the stirring apparatus of the freezer. Furthermore, when fast freezing is desired no estimate can be made as to just how long the fast freezing can be maintained in case it is initiated after the material has reached the freezing stage, such as when completion of the freeze must be rushed.

In connection with refrigerated cabinets and refrigerators, my invention is equally adaptable, since it can be set to provide fast freezing for a predetermined period of time and can be depended upon to return the refrigerating unit to normal operation at the completion of that period.

In connection with an ice cream freezer or the like, under normal operation my invention operates in the conventional way, driving the freezer and intermittently driving the refrigerant compressor under control of the existent pressure in the refrigerant lines. However, in addition to normal operation, a solenoid operated demand valve controls back pressure in the freezer barrel and is controlled normally by a pressure element which is located between the demand control valve and the freezer barrel or expansion chamber and being preferably closely related to the barrel for control by the temperature and pressure within the barrel. A timer actuated switch for controlling fast freezing periods, and a thermal overload switch for disrupting the entire circuit in case of overload, constitute the other parts of the invention; in combination with the cooperative parts of the operating circuits and elements.

The objects and advantages of the invention are as follows:

First, to provide a circuit for a freezer which will break automatically when the material being frozen reaches a consistency sufficient to cause overload on the freezer driving motor, thus to protect the motor and the operating parts of the freezer against damage.

Second, to provide control means and a circuit therefor in which in the event of overload on any of the equipment, the circuit will be broken and all operation including compression of refrigerant will be terminated.

Third, to provide a circuit as outlined with hand control switch means for terminating operation of the refrigerant compressing means at will while maintaining operation of the freezer equipment.

Fourth, to provide a control as outlined with combined pressure and thermal control means in conjunction with a demand control valve in the suction side of the refrigerant line for automatically controlling the temperature within the freezer barrel or expansion chamber.

Fifth, to provide a control as outlined with manually adjustable timing means for quick freezing operations with the time period adjustable at will, and with adjustment of said timing means providing an indicator during the time elapse period and eliminating control of the refrigerant compressor by the convention suction line pressure control means.

In describing the invention reference will be made to the accompanying drawings, in which:

The figure is a wiring diagram of the electrical circuits and a circuit diagram of the refrigerating system and its control means and showing the relationship between the electrical controls and devices and the refrigerating circuit.

The conventional freezing unit consists of a compressor 10 which discharges to a condensing coil 11 where the refrigerant is condensed to a liquid, and thence discharges to the conventional receiver and separator (not shown because it is well known and conventional in the art), and thence is checked and controlled by an expansion valve 12 to discharge into the expansion coils or freezer barrel 13, and a return line 14 to carry the expanded refrigerant back to the intake 16 of the compressor, and with a pressure control 17 interposed in the return or suction line 14, for control of the driving motor.

A motor 18 drives the freezer mechanism, and a second motor 19 drives the compressor which is controlled by a switch 20 operated by the pressure control 17.

With this conventional arrangement, the compressor operates until the pressure in the suction line has been reduced to a predetermined value and the gas content compressed and delivered to the condensing coil. Operation is then automatically terminated until the pressure in the suction line again raises to the value for which the pressure switch is adjusted. With an ice cream freezer in circuit, the motor 18 operates until the line switch is manually opened.

My invention consists in installing a thermal breaker switch 21 in the power supply circuit to break either or both of the main power lines 22 and 23 and to control this switch by means of a suitable thermal warp element 24 in the main line of the freezer circuit so that in the event of overload the warp element 24 will heat under the increased passage of current and cause the switch 21 to break the circuit and maintain it in its circuit breaking position until manually closed. Obviously there is little possibility of the compressor motor becoming overloaded, so that the switch serves mainly against overloads on the freezer motor and is so intended.

The compressor is controlled by the conventional magnetic switch 25 through a suitable electromagnet or solenoid 26 and indicated as of the low-voltage type though not so limited, and a manually-operable switch 27 is located in the main control circuit so that the compressor can be individually controlled for operation irrespective of operation of the freezer.

A thermal pressure switch 28 has its expansion element in communication with the discharge side of the freezer barrel 13 or with the portion 29 of the suction line and preferably at or relatively close to the freezer, and a demand control valve is installed in the suction line at the juncture of the portions 14 and 29 with the pressure switch 28 interposed between this valve 30 and the freezer. This demand valve is normally partly or fully closed and is controlled by a solenoid 31, being normally in a pressure restraining position to maintain a predetermined pressure in the portion 29 of the suction line and in the freezer barrel and is opened when the temperature and consequently the pressure rise to a predetermined degree.

A manually adjustable time switch 32 is controlled by a suitable timer 33 which may be of either, the mechanical, electric or electronic type and which is provided with suitable time setting and indicating means indicated in its simplest form as consisting of a pointer 34 which can be manually adjusted to any desired time-elapse period, and which normally holds the switch open to break the circuits, and a signal such as the lamp 35 is arranged to provide an indicator during the time-elapse period of operation of the timer.

If the unit is to be initially operated or has not been operated for some time the pressure will be equalized throughout the refrigeration system including the suction line 29 and 14, and the freezer and compressor, and the pressure in the suction line will have closed the switch 20 and switch 28.

If only the freezer is to be initially operated, closing of switch 21 will complete circuit from power line 22, through switch 21, warp element 24, conductors 36 and 37, motor 18, and conductors 38 and 39 to the other side 23 of the power line, all other circuits being open, switch 32 being held open by the timer with the indicator returned to zero.

To start the compressor the switch 27 is manually closed completing circuit through conductor 40, switch 20, conductor 41, switch 27, electromagnetic element 26 of the pressure switch, conductors 42 and 43 to line 39, and thus closing switch 25 to contact 44, completing circuit from line 36 through conductor 44, switch 25, motor 19 and conductor 43 to line 39, starting the compressor which pumps the gas out of the suction line, compresses and discharges the compressed gas into the condensing unit 11 for re-expansion through the expansion valve 12 which sets up a predetermined pressure in the line 29 which is normally maintained by the valve 30.

When the pressure is reduced to a predetermined degree in the suction line 14, the pressure control retracts causing the switch 20 to open to terminate operation of the compressor and which operation is again initiated when the pressure again builds up to a predetermined degree in the suction line by again closing the switch 20.

Also in circuit is the temperature control switch 28 which is maintained under a predetermined pressure by the valve 30. If the temperature increases in the expansion chamber obviously the pressure will increase causing expansion of the element 45 which closes the switch 28 to complete circuit through line 36, conductor 46, switch 28, conductors 47 and 48 to solenoid 31 and conductor 49 to line 39, energizing the solenoid and opening valve 30 which releases the pressure in the expansion chamber and thus permitting the injection of more liquefied gas through the expansion valve thus lowering the temperature and pressure and causing contraction of the member 45 in turn causing opening of the switch 28, de-energizing the solenoid and allowing the valve 30 to close. Thus each time there is an increase in temperature with resultant increase in pressure the valve 30 opens and releases the pressure to allow the expansion of more gas, automatically maintaining a predetermined temperature for the freezer.

When a fast-freeze period is desired, the timer indicator 34 is adjusted to the time interval desired and which adjustment causes or allows the switch 32 to close completing one circuit from line 36 through switch 32, conductor 50, lamp 35, and conductors 51 and 49 to line 39, and in parallel completing circuit through conductor 52 and 48 to solenoid 31 and conductor 49 to line 39, shunting switch 28 so that it is ineffective with the valve 30 held open continuously for maximum expansion of liquefied gas into the expansion chamber; and also in parallel through conductor 53 and switch 27 to solenoid 26, conductor 42, and conductor 43 to line 39, shunting switch 20 so it is ineffective and closing switch 25 to complete circuit through conductor 44 and switch 25 to motor 19 and conductor 43 to line 39. Thus irrespective of the pressure in the suction line or the temperature of the expansion chamber, expansion and consequent freezing will be maintained at maximum without any control from the system, and when the time interval has terminated and the timer has returned to zero, it has opened the switch 32 breaking these latter parallel circuits, extinguishing the lamp 35, returning control of the valve 30 to the pressure control 45, and control of the compressor to the pressure control 17, for normal automatic operation and control.

If at any time the freezer imposes a load sufficient to warp the element 24, a circuit will be completed from the warp element 24 through the solenoid 54 to line 23 breaking circuit and terminating operation of the entire unit.

I claim:

1. A refrigerating system comprising refrigerant compressing means and driving means therefor, an expansion chamber; and a circulatory path for refrigerant including a suction line, means controlled by the existent pressure in said suction line for controlling operation of said driving means, and pressure control means controlled by the existent pressure and temperature in said expansion chamber and including a normally closed valve for retaining pressure within said expansion chamber for limiting expansion of refrigerant, and means for opening said valve when the pressure and temperature in said expansion chamber has increased to a predetermined value and controlled by said pressure control means to release the pressure for increased expansion of refrigerant.

2. A structure as defined in claim 1; said system including a freezer and driving means therefor, said freezer including said expansion chamber; and means for terminating operation of said system when material in said freezer reaches a consistency creating overload on the driving means for the freezer.

3. A structure as defined in claim 1; said system including a freezer combined with said expansion chamber; driving means for continuously driving said freezer; a manually adjustable and settable timer; said system operating normally when said timer is in zero position, and means disrupting all controls of said system when said timer is adjusted to any predetermined time-elapse period for maximum heat transfer and returning said system to normal operation when said timer returns to zero position.

4. A refrigerating system comprising; refrigerant compressing means including a circuit having a return line, a freezer having an expansion chamber and an expansion valve; a first motor for driving said compressing means and a first circuit therefor including a pressure controlled magnetic switch controlled by existent pressure in said return line, and a manually operable switch for manual control of operation of said compressing means at will, a second motor for driving said freezer and a second circuit therefor; a normally closed pressure holding valve in said return line for holding pressure within said expansion chamber to control expansion of refrigerant therein and including electro-magnetic operating means and a circuit therefor including a thermal pressure switch operable to complete circuit to said electro-magnetic operating means when the pressure and temperature in said expansion chamber rises to a predetermined value to open said valve and release the pressure for increased expansion of refrigerant into said chamber, and breaking the circuit when the pressure and temperature have dropped to a lower value to release the valve to close.

5. A system as defined in claim 4; the three circuits including a signal circuit, a shunting circuit for each, said thermal pressure switch, and said pressure controlled magnetic switch; a timer including a switch normally breaking all of said three circuits, said timer being adjustable at will for time-elapse periods and upon adjustment causing completion of all of said three circuits to disrupt automatic control of said refrigerating system and operate the system at full refrigerating capacity and returning the system to automatic control when the time period has elapsed.

6. A system as defined in claim 4; the three circuits including a signal circuit, a shunting circuit for each, said thermal pressure switch, and said pressure controlled magnetic switch; a timer including a switch normally breaking all of said three circuits, said timer being adjustable at will for time-elapse periods and upon adjustment causing completion of all of said three circuits to disrupt automatic control of said refrigerating system and operate the system at full refrigerating capacity and returning the system to automatic control when the time period has elapsed; a source of power for all of said circuits and including a thermal overload switch operable to break all circuits and disrupt operation of the entire system when the load on the second motor is increased to a predetermined value due to increased resistance of the material being frozen in the freezer.

7. Control means for a refrigerating unit including a compressor and a driving motor and a circuit therefor; an expansion chamber comprising a barrel for a freezer, a second motor and a circuit therefor for driving the freezer; a suction line in communication with one side of said expansion chamber and a compression line in communication with the other side and including an expansion valve; a pressure switch and a circuit therefor controlled by existent pressure in said suction line for controlling said driving motor; a demand control valve in said suction line and a second pressure switch interposed between said demand control valve and said expansion chamber and controlled by the existent pressure in said expansion chamber for controlling said valve and including electro-magnetic actuating means and a circuit therefor including said second pressure switch for opening and closing said valve through respective increases and decreases in pressures and temperatures in said expansion chamber for maintaining a predetermined temperature therein, and a supply of current for said circuits; a main circuit for said supply of current, and a thermal overload breaker switch for said main circuit for breaking all of said circuits through overload imposed on said second motor by over-freezing of material in the freezer; a time switch and a manually settable timer therefor and controlling three circuits respectively a signal circuit, a shunting circuit for each, said second pressure switch and said first pressure switch, and normally maintaining said three circuits open; said time switch completing said three circuits upon manual setting or adjustment of said timer for elimination of all controls of said refrigerating unit and breaking said three circuits upon termination of the time-elapse period for which the timer is adjusted, for return of the refrigerating unit to automatic control.

FRANK F. KOLZ.

REFERENCES CITED

The following references are of record in the file of this patent:

UNITED STATES PATENTS

| Number | Name | Date |
| --- | --- | --- |
| 1,631,345 | Stock | June 7, 1927 |
| 2,338,362 | Smith | Jan. 4, 1944 |
| 2,363,273 | Waterfill | June 2, 1943 |